Feb. 20, 1968 S. L. BLACK 3,369,478
SINGLE CUP, DRY WASTE COFFEE BREWING AND DISPENSING MECHANISM
Filed April 22, 1966 4 Sheets-Sheet 2

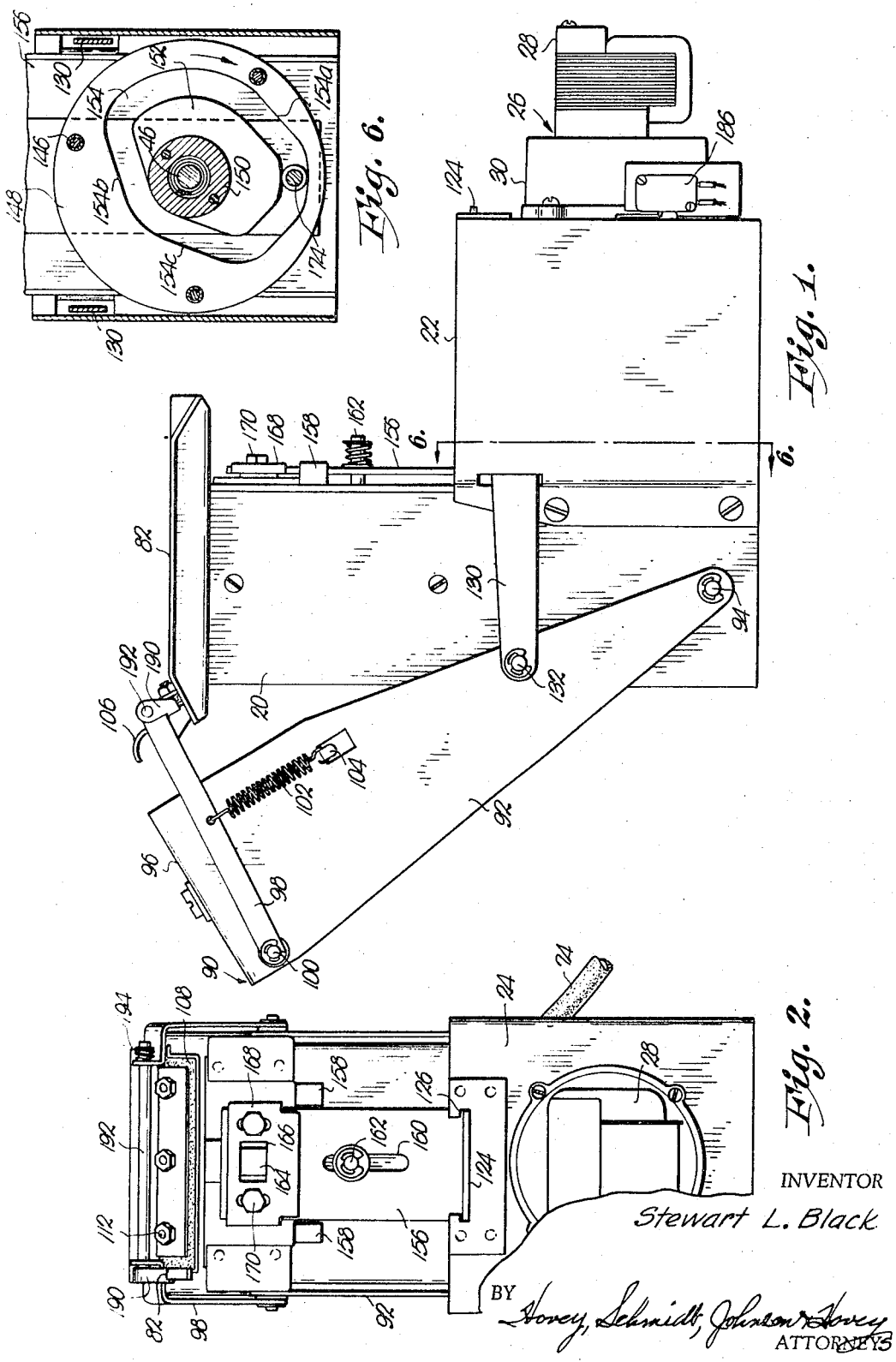

INVENTOR
Stewart L. Black
BY
Hovey, Schmidt, Johnson & Hovey
ATTORNEYS

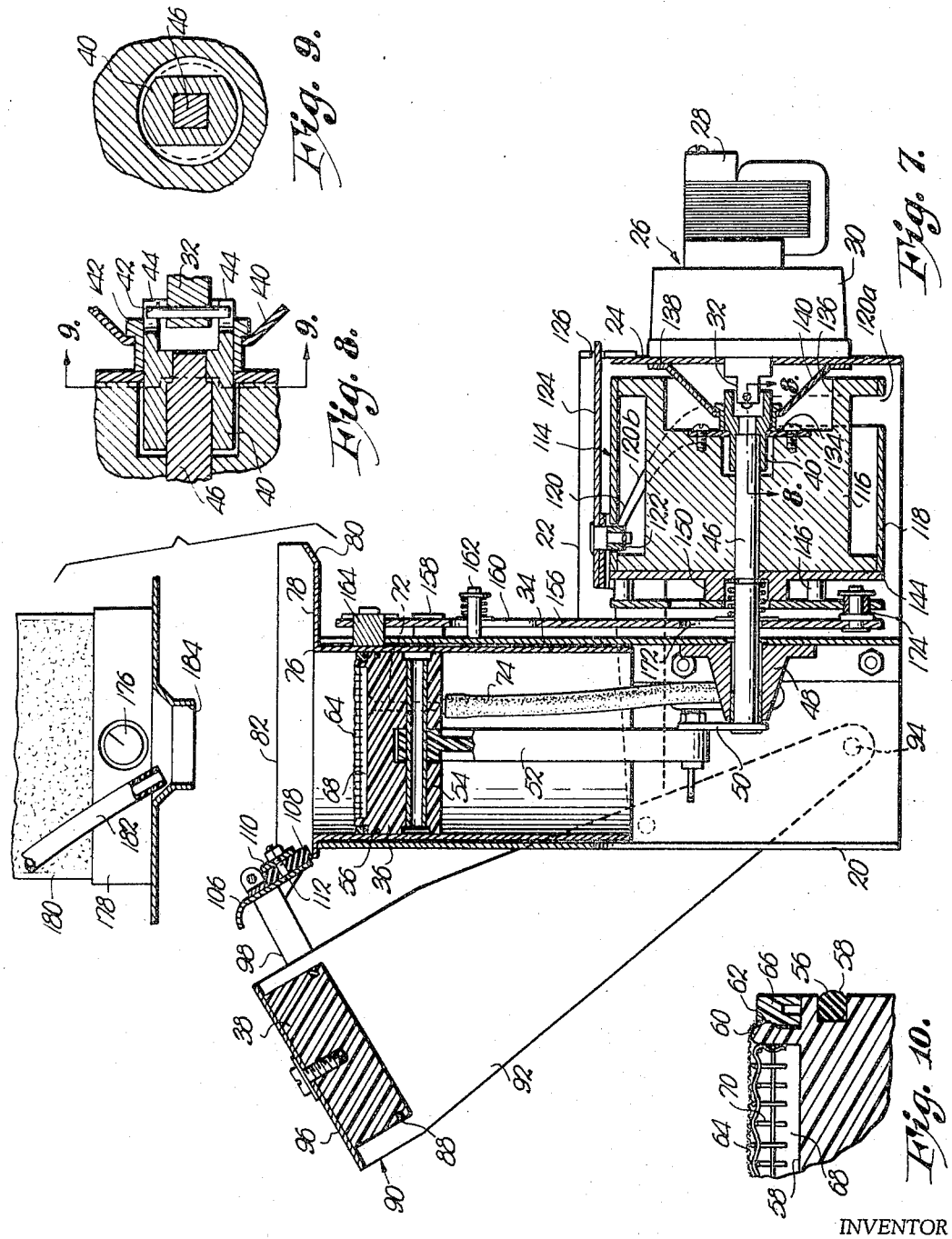

Feb. 20, 1968   S. L. BLACK   3,369,478
SINGLE CUP, DRY WASTE COFFEE BREWING AND DISPENSING MECHANISM
Filed April 22, 1966   4 Sheets-Sheet 4
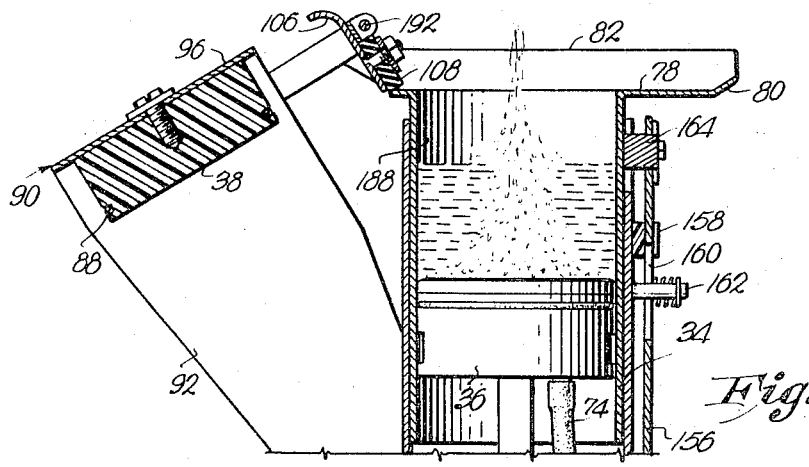
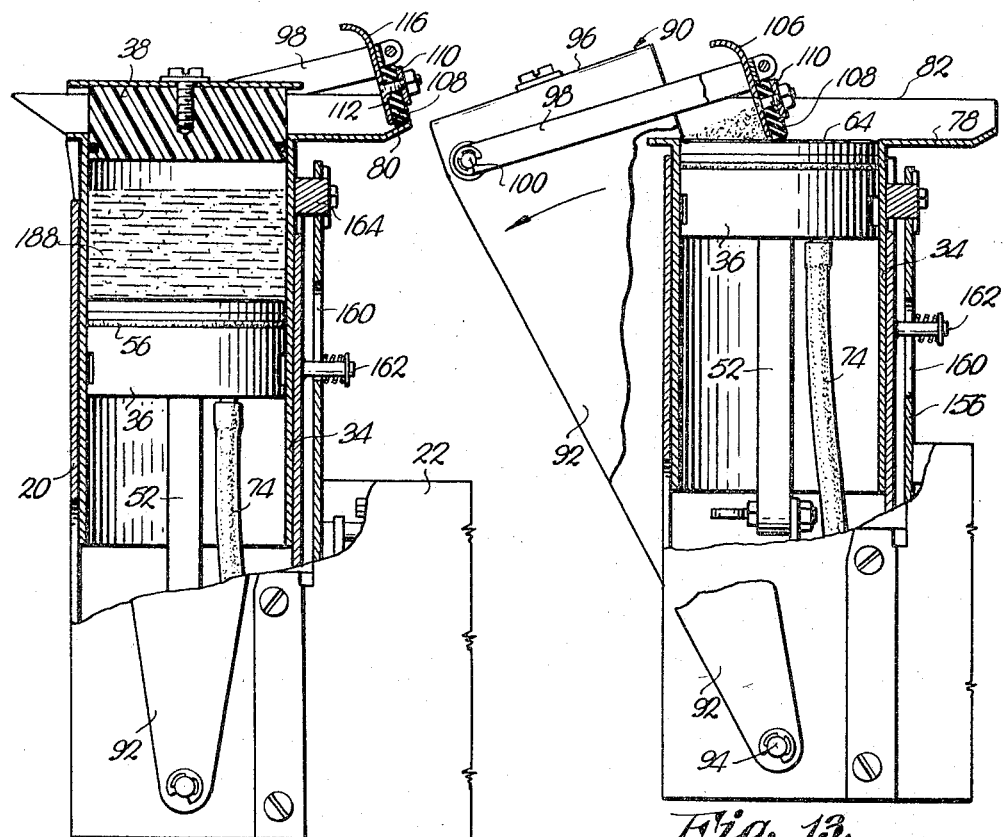
Fig. 11.
Fig. 12.
Fig. 13.
INVENTOR
Stewart L. Black
BY
Hovey, Schmidt, Johnson & Loovey
ATTORNEYS United States Patent Office 3,369,478
Patented Feb. 20, 1968

3,369,478
SINGLE CUP, DRY WASTE COFFEE BREWING
AND DISPENSING MECHANISM
Stewart L. Black, Lee's Summit, Mo., assignor to The Vendo Company, Kansas City, Mo., a corporation of Missouri
Filed Apr. 22, 1966, Ser. No. 544,435
12 Claims. (Cl. 99—289)

This invention relates to a dry waste coffee brewing and dispensing machine wherein the waste is expelled from the brewing cylinder after each dispensing operation by scraping the waste from the brewed coffee filter screen.

Coffee vending machines commonly employ a cylinder in which the coffee is brewed and a piston in the cylinder which discharges the brewed coffee therefrom through a filter which prevents the coffee grounds from passing from the cylinder to the dispensing station. This necessitates that, at the end of each brew cycle, the residue collected by the filter be ejected from the cylinder prior to the next brew cycle. In liquid waste coffee dispensing apparatus, where a permanent type filter is employed, removal of the waste is frequently accomplished by back flushing, thereby providing a liquid waste which must then be drained from the brewing mechanism.

When coffee vending machines of the liquid waste type are to be installed at locations where a drainage connection is not readily available, it is necessary to provide a waste tank within the cabinet of the machine which, of course, must be of sufficient size to accommodate the waste produced by operation of the apparatus between periodic servicing. This has led to the development of dry waste coffee dispensing apparatus which materially reduces the difficulties presented by a liquid waste machine. However, dry waste systems require that means be provided to dry the spent coffee grounds, remove the latter from the brewing cylinder, and clean the brew filter, if such filter is of the permanent type.

Since back flushing is no longer available as a means of cleaning the filter in a dry waste system, some dry waste machines employed heretofore have utilized a disposable filter for each brew cycle rather than a permanent filter in order to entirely avoid the cleaning problem. This approach, however, is subject to the inherent disadvantage of requiring additional mechanism for replacing a used filter with a fresh filter at the end of each brew cycle.

Furthermore, drying of the waste to avoid the disposal problem has also frequently resulted in increased complication of the dispensing apparatus. A common approach has been to employ an air compressor as a component of the system, air under pressure being discharged through the brew filter to purge the brew cylinder of all brewed coffee, leaving only an essentially dry waste for subsequent removal. However, an air compressor is a relatively expensive item and, therefore, is not desirable as a vending machine component.

It is, therefore, an object of this invention to provide a dry waste coffee brewing and dispensing machine having a permanent filter which is cleaned by a scraper member at the close of each brew cycle so that the need for providing disposable filters is obviated.

Another object of the instant invention is to provide a dry waste machine as aforesaid in which the waste is dried by compressed air trapped in the brewing cylinder which expands through the filter after the brewed coffee is discharged from the cylinder, thereby eliminating the need of providing an air compressor as a component of the system.

Still another object is to provide a permanent filter for a dry waste system which is self-cleaning insofar as clogging of the openings therein with fine residue is concerned, by virtue of construction of the filter of a flexible, synthetic resin material in conjunction with the use of expanding compressed air as aforesaid to remove fine particles from the filter embedded therein.

A further object of the invention is to provide a scraper member as aforesaid for wiping spent grounds from the surface of the filter wherein such member is movable with a closure for the cylinder which is utilized to close the open end of the cylinder through which water and ground coffee enter at the beginning of the brew cycle, and to provide a brewing cylinder and piston arrangement in which the filter is mounted on the piston and which is operable, after the brewed coffee is discharged from the cylinder, to position the upper surface of the filter flush with the top of the cylinder for scraping engagement by the scraper member upon movement of the latter with the closure transversely of the axis of the cylinder.

An additional object is to provide dry waste coffee brewing and dispensing apparatus as aforesaid which is operated by a single prime mover having a rotatable output shaft, through the medium of a cam arrangement intercoupling the shaft with the cylinder and the closure to effect reciprocal movement of both of the same in synchronism with reciprocation of the piston.

In the drawings:

FIGURE 1 is a side elevational view of the brewing and dispensing apparatus showing the components thereof in their standby positions;

FIG. 2 is a front elevational view;

FIG. 6 is a vertical sectional view taken along line 6—6 of FIG. 1;

FIG. 7 is a vertical sectional view taken along line 7—7 of FIG. 4, which also illustrates the coffee auger and hot water discharge tube above the top of the brewing cylinder;

FIG. 8 is a fragmentary, horizontal sectional view taken along line 8—8 of FIG. 7;

FIG. 9 is a vertical sectional view taken along line 9—9 of FIG. 8;

FIG. 10 is a detail view showing a portion of the piston head in vertical section;

FIG. 11 is a fragmentary, vertical sectional view illustrating the filling of the brewing cylinder and showing the piston during its down stroke, said piston being revealed in elevation for clarity;

FIG. 12 is a fragmentary view partially in side elevation and partially in vertical section showing the cylinder closed and illustrating the piston during its up stroke; and FIG. 13 is a fragmentary view partially in side elevation and partially in section illustrating the scraping of the grounds from the filter and showing the piston during movement thereof downwardly toward its standby position.

Figure 4:
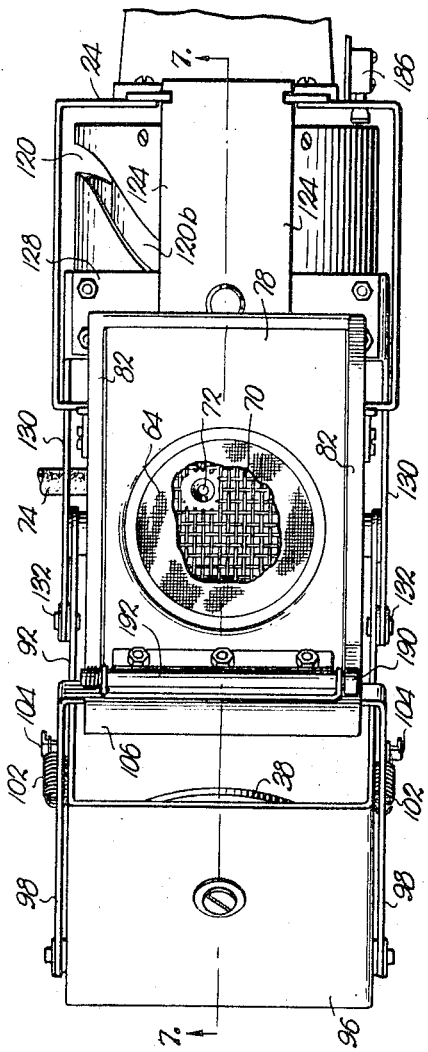
FIG. 4 is a plan view, a portion of the filter being broken away to reveal the supporting grid and brewed coffee passage therebeneath.

It is to be understood that the drawings show only the brewing and dispensing mechanism per se, with the exception of FIG. 7 which also illustrates a portion of the hot water and ground coffee delivery structure. Other components of the system not shown include a conventional cup dropper, the control and operating mechanism for the hot water and ground coffee delivery structure, the dispensing station, and the cabinet which houses all of the various system components. When operated as a vendor, conventional coin-controlled mechanism would also be utilized to control over all system operation in response to deposit of appropriate coinage. These various other system components are all well known in the art; hence, only the improvements of the instant invention directed to the dry waste brewing and dispensing mechanism will be described herein.

The numeral 20 denotes an elongated, upright housing in the form of a tube of rectangular cross-sectional configuration having a pair of laterally extending side walls 22 projecting therefrom and rigid with an end plate 24, the latter serving as a mount for a prime mover 26 consisting of an electric motor 28 driving a gear reduction transmission 30 having a rotatable output shaft 32 (FIG. 7). Through drive mechanism to be described in detail hereinafter, output shaft 32 effects vertical reciprocation of an upright brewing cylinder 34 within housing 20, reciprocates a piston 36 within cylinder 34, and shifts a closure in the form of a lid 38 back and forth between the positions illustrated most clearly in FIGS. 7 or 11 and 12.

A coupling 40 of sleeve-like configuration has one end thereof apertured to loosely receive shaft 32, a cross pin 42 rigid with the end of shaft 32 being inserted into opposed slots 44 (FIG. 8) as transmission 30 is secured to plate 24 during fabrication of the apparatus. The opposite end of the coupling is bored to receive a crankshaft 46 and is rigid with the latter to form a driving connection between output shaft 32 and crankshaft 46. The other end of crankshaft 46 (FIG. 7) is received by a bushing 48 mounted within housing 20 beneath cylinder 34, a crank arm 50 being employed to interconnect crankshaft 46 with the lower end of a piston rod 52 depending from piston 36. The upper end of rod 52 is journalled in piston 36 by a hollow cross pin 54. An O-ring 56 is received in an annular groove 58 in piston 36 to form a sliding seal between the piston and the internal surface of cylinder 34.

Piston 36 has an upper face 58 and is provided with an annular flange 60 adjacent the periphery of the piston which projects upwardly, as is clear in FIGS. 7 and 10. Flange 60 has an outwardly extending lip 62 which is utilized to sandwich the peripheral edge portion of a flexible, circular filter 64 between lip 62 and a clamp ring 66. Face 58, flange 60, and filter 64 define a cylindrical cavity 68 containing a supporting grid 70 which is rigid with flange 60 and engages the underside of filter 64. A passage 72 (FIGS. 4 and 7) communicates cavity 68 with a nipple depending from the bottom of piston 36 and received by the upper end of a flexible delivery conduit 74.

Cylinder 34 has an open top 76 provided with a horizontal platform 78 having an upwardly extending lip 80 at its forward edge and a pair of opposed side flanges 82. A pair of elongated, upright nylon guides 84 (FIG. 5) are secured to opposite sides of housing 20 and are slidably received by respective opposed, elongated, upright slide members 86 which confine the cylinder to reciprocal movement vertically in housing 20. Note that each of the members 86 is of transversely U-shaped configuration and receives the associated guide 84 in a manner to prevent lateral displacement of the cylinder.

Lid 38 comprises a cylindrical plug having an O-ring 88 in the circumferential periphery thereof which seals the open top 76 of cylinder 34 when the latter and lid 38 are brought into closing relationship as illustrated in FIG. 12. Lid 38 is swingable between the positions illustrated in FIGS. 7 and 12 and is carried by an elongated, U-shaped plate 90 having a pair of opposed legs 92 connected at their lower ends to housing 20 by pivot pins 94. The top of lid 38 is secured to the underside of the bight portion 96 of plate 90 for swinging movement with plate portion 96 about the horizontal axis defined by the opposed pins 94.

A pair of arms 98 have their rearward ends pivotally secured to the upper portions of respective legs 92 by pins 100, each arm 98 being biased for rotation in a clockwise direction (as viewed in FIGS. 1, 7 and 11–13) by a spring 102 connected to the arm intermediate the ends thereof, and a tab 104 projecting from the associated leg 92. The forward ends of arms 98 are integral with a mounting plate 106 extending therebetween. A rubber wiper 108 is clamped between plate 106 and a metal strip 110 as illustrated. Three threaded studs 112 project from plate 106 through openings in wiper 108 and strip 110 and are received by nuts which securely clamp the wiper between the plate and the strip. Wiper 108 serves as a scraper member for cleaning filter 64 and is operated in a manner to be described in full hereinafter.

Reciprocation of cylinder 34 and swinging of lid 38 and wiper 108 is accomplished by a cam drive between prime mover 26 and these driven parts of the apparatus. A drum cam 114 has a solid, cylindrical core 116 which mounts an outer cam cylinder 118 having a cam slot 120 therein receiving a follower 122 carried by a horizontally reciprocable slide 124. As is clear in FIG. 7, cam cylinder 118 is spaced a sufficient distance from core 116 to provide clearance for movement of follower 122 in slot 120. The forward end of slide 124 projects through a guide slot 126 in end plate 24, slide 124 including a cross plate 128 at its rearward end having a pair of drive links 130 rigidly secured to respective extremities thereof. Each link 130 extends horizontally rearwardly and is pivotally connected to a corresponding leg 92 by a pivot pin 132. Slot 126 has sufficient play to permit slight vertical displacement of links 130 as slide 124 is reciprocated.

Core 116 has a central bore which receives crankshaft 46, an apertured retainer plate 134 being secured to core 116 and extending across the bore to mount coupling 40 in a position to receive the forward end of crankshaft 46. The bore of core 116 is substantially enlarged at 136, an end plate 138 on core 116 being provided and having a frusto-conical central section 140 which extends into enlargement 136 and receives a fitting or collar 142 telescoped over coupling 40 to rigidly intercouple section 140 and coupling 40 by a press fit.

The rearward end of core 116 is provided with a circular plate 144 having three spacers 146 projecting horizontally rearwardly therefrom and receiving machine screws which secure an outer cam plate section 148 to plate 144 for rotation with drum cam 114. Plate 144 has a central boss 150 to which an inner cam section 152 is secured by a pair of machine screws. The outer and inner cam sections 148 and 152 define an irregular cam slot 154 between the continuous, internal edge of section 148 and the outer, peripheral edge of section 152, as is clear in FIG. 6.

A vertical slide plate 156 is vertically reciprocable along a path of travel defined by a pair of nylon guides 158 on the front of housing 20. An elongated, vertical slot 160 in slide plate 156 receives a pin 162 projecting from the front of housing 20 and also serving to confine the motion of the slide plate to a vertical path. The upper end of plate 156 is joined to cylinder 34 by a tongue 164 rigid with cylinder 34 which extends through an opening in slide plate 156 and an opening 166 in a secondary, adjustable plate 168 mounted on plate 156 by a pair of screws 170. Plate 168 may be adjustably positioned on plate 156 to set the position of cylinder 34 with respect to piston 36 at the desired level.

The lower end of slide plate 156 extends between cam sections 148 and 152 and housing 20 and is provided with a clearance opening 172 for crankshaft 46. A follower 174 projects forwardly from the lowermost extremity of slide plate 156 into cam slot 154 as is clear in FIG. 7. Thus, plate 156 is shifted along a vertical path of travel in accordance with the shape of slot 154 as follower 174 rides therein. FIGURE 7 also fragmentarily illustrates the structure utilized to deliver hot water and ground coffee into the open top 76 of cylinder 34. The end of a coffee auger is shown at 176 projecting from the base 178 of an upright coffee container having a glass wall 180. A hot water delivery tube 182 is shown terminating at the edge of an outlet 184 disposed directly beneath auguer 176 and directly above top 76.

Operation

The brewing and dispensing apparatus is shown in its standby position in FIGS. 1–9. When utilized as a component of a coffee vending machine, operation is initiated by the deposit of proper coinage in a conventional coin-controlled mechanism which actuates the cup dropper when proper credit is established. This drops the cup into the delivery station where it may then receive brewed coffee and be subsequently withdrawn by the customer.

The operational cycle of the brewing and dispensing apparatus is initiated by the cup dropper timer motor after the cup is released through energization of motor 28 by a control circuit (not shown). Motor 28 remains energized for a time period which may be terminated by the opening of a carry-over switch 186 (FIG. 1) upon actuation thereof by drum cam 114. It will be appreciated that motor 28 may be energized and de-energized by any one of a number of conventional control arrangements, so long as output shaft 32 is driven through one complete revolution for each vend cycle, commencing with the various movable parts of the apparatus in the standby positions illustrated.

As motor 28 is energized, the coin-controdlled mechanism also energizes a solenoid valve (not shown) which permits a predetermined amount of hot water to be discharged from tube 182. Simultaneously, auger 176 is driven for a predetermined amount of time to dispense ground coffee into brewing cylinder 34.

At this juncture, it should be noted that, in standby, cylinder 34 is at the lower limit of its path of travel (see FIG. 6), piston 36 has begun a downstroke (see FIG. 3—crank arm 50 moves in a counterclockwise direction), wiper 108 is retracted with lid 38 clear of cylinder 34, and filter 64 is disposed below top 76. Therefore, as motor 28 is energized, piston 36 moves downwardly to enlarge the size of the brewing chamber 188 within cylinder 34, as illustrated in FIG. 11.

Cam sections 148, 152 are driven in a clockwise direction as viewed in FIG. 6; therefore, follower 174 is engaged by the edges of the cam sections defining stretch 154a of slot 154 shortly after motor 28 is energized and during filling of the cylinder. FIGURE 11 shows that cylinder 34 has shifted to a higher level; the cylinder will remain at this level during nearly the first one-half of the cycle because of the ininterrupted length of stretch 154a.

Figure 5:
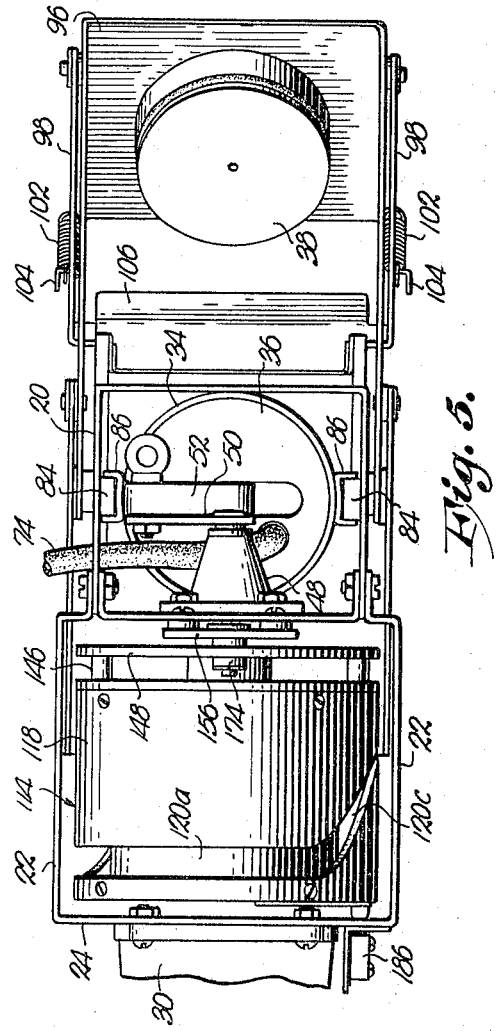
FIG. 5 is a bottom view.
Figure 3:
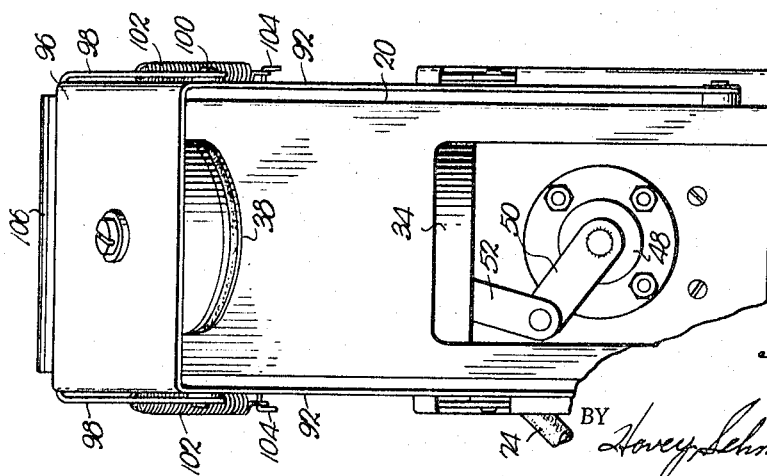
FIG. 3 is a rear elevational view.

Drum cam 114 has two periods of dwell caused by a portion 120a (FIGS. 5 and 7) of cam slot 120 which lies in a plane perpendicular to the axis of rotation of drum cam 114, and a similar straight portion on the opposite side of the drum which is hidden from view in FIG. 4. The two dwell portions of the drum cam slot are interconnected by angularly disposed stretches 120b (FIGS. 4 and 7) and 120c (FIG. 5). Since follower 122 is initially disposed at the beginning of a dwell portion of cam slot 120 (drum cam 114 is rotated by motor 28 in a direction to move stretch 120b away from slide 124—see FIG. 4), lid 38 does not move from its standby position until after the brewing cylinder is filled.

As cam slot stretch 120c of the drum cam moves into engagement with follower 122, slide 124 is shifted forwardly to swing lid 38 to a position directly above the open top 76 of cylinder 34. As lid 38 approaches this position, cylinder 34 is shifted upwardly by stretch 154b of cam slot 154 to seal the top of the cylinder, as illustrated in FIG. 12. At the time the seal is effected, piston 36 has commenced its upstroke and will ultimately cause the brew to be forced through filter 64 and along passage 72 to the delivery conduit 74 for discharge into the cup.

FIGURE 12 illustrates that air is trapped in chamber 188 between the brew and the undersurface of lid 38, such air being compressed during the upstroke of piston 36. Thus, chamber 188 is purposely not completely filled so that a layer of trapped air will remain in chamber 188 on closure thereof.

After the coffee brew has been forced from chamber 188 by the upstroke of piston 36, the compressed air at the top of the cylinder follows and expands through filter 64 as it is discharged. This serves to dry the coffee grounds deposited on the upper surface of the filter and purge the delivery conduit 74. Additionally, the expanding air discharges fine coffee residue embedded in the filter openings. Although this fine residue will ultimately be dispensed to a customer, it is sufficiently fine and of a small enough quantity to be unobjectionable from a consumer standpoint.

As discussed hereinabove, filter 64 is composed of an inert, flexible, synthetic resin substance. More particularly, the filter should have sufficient resiliency to preclude permanent deformation thereof under the pressure attained in the chamber, and be capable of stretching or flexing in response to expansion of the compressed air therethrough in a manner to cause a momentary enlargement of the openings therein so that the expanding air will dislodge the fine residue. A nylon screen with 320 holes per linear inch is preferred.

During the portion of the upstroke of piston 36 which effects discharge of the brew and the trapped air, follower 122 of slide 124 is riding in the dwell portion 120a of cam slot 120, thereby maintaining lid 38 stationary. As the discharge phase is completed, follower 174 of slide plate 156 is engaged by stretch 154c of cam slot 154 to lower cylinder 34 to a disposition clearing lid 38, whereupon follower 122 is engaged by stretch 120c of cam slot 120 to begin swinging movement of lid 38 away from the cylinder annd toward its standby position. At this time, piston 36 is completing its upstroke and cylinder 34 continues to move downwardly until the upper surface of filter 64 and the upper surface of platform 78 are flush with one another. Piston 36 and cylinder 34 then move downwardly a short distance in unison as wiper 108 scrapes across the upper surface of filter 64, as illustrated in FIG. 13. Ultimately, therefore, the spent grounds are scraped over the rear edge of platform 78 into a suitable container (not shown).

It should be noted that a dog 190 is disposed adjacent one end of wiper 108 and is rigid with a rod 192 rotatably carried by plate 106. A spring 194 (FIG. 2) is connected to rod 192 and biases the latter in a clockwise direction as viewed in FIG. 1, thereby yieldably maintaining dog 190 in the position illustrated so that, when lid 38 is shifted from its standby position to the position thereof illustrated in FIG. 12, dog 190 will ride upon the adjacent flange 82 of platform 78 to hold wiper 108 above platform 78. Upon return movement, however, when the filter is scraped, said flange 82 shifts dog 190 against the action of spring 194 so that wiper 108 now rides along platform 78 in scraping contact therewith.

Having thus described the invention, what is claimed as new and desired to be secured by Letters Patent is:

1. In a coffee brewing and dispensing machine:
   an unpright brewing cylinder having an open top;
   a piston reciprocable up and down in said cylinder;
   a filter mounted on the piston thereabove and reciprocable therewith in the cylinder for receiving hot water and ground coffee delivered into the cylinder upon the filter;
   power means coupled with the piston for reciprocating the same;
   structure operable by said power means to effect closure of said top after delivery of hot water and ground coffee into the cylinder and for opening said top after evacuation of the cylinder of brewed coffee;

means beneath the filter for evacuating the cylinder of brewed coffee flowing through the filter in response to upward movement of the piston while said top is closed; and mechanism operable by said power means for scraping spent coffee grounds off the filter upon said opening of the top.

2. The invention of claim 1:
said structure including a lid shiftable to and from a position above said top, and
said mechanism including a wiper movable across said top and means coupling the wiper with the lid for movement of the wiper across said top as the lid is shifted out of said position.

3. The invention of claim 2:
said cylinder being reciprocable up and down,
said structure including apparatus operably coupling said power means with said cylinder for raising the latter to close said top by the lid when the latter is in said position.

4. The invention of claim 3:
said apparatus having means for lowering the cylinder to a position placing its top flush with the upper surface of the filter prior to movement of the wiper across said top.

5. The invention of claim 3:
said apparatus having means for lowering the cylinder to a position placing its top flush with the upper surface of the filter as the piston commences downward movement in the cylinder and prior to movement of the wiper across said top, and for thereafter lowering the cylinder in unison with the piston through a predetermined displacement as said wiper moves across said top.

6. The invention of claim 1:
said cylinder being reciprocable up and down,
said structure including a lid shiftable to and from a position above said top, and apparatus operably coupling said power means with said cylinder for raising the latter to close said top by the lid when the latter is in said position.

7. The invention of claim 1:
said mechanism including a wiper movable back and forth across said top; and
means engageable with said mechanism for raising the wiper above the top during movement of the wiper in one direction across the top, whereby the wiper scrapes across the top only during movement of the wiper in the opposite direction.

8. The invention of claim 1:
said filter comprising a flexible screen of synthetic resin material extending transversely of said cylinder and having an upper surface for supporting the spent coffee grounds deposited on the filter as the cylinder is evacuated,
said mechanism including a wiper and means mounting said wiper for movement across said surface in scraping contact therewith.

9. In coffee brewing and dispensing apparatus:
an upright brewing cylinder having an open top;
a reciprocable piston in said cylinder and having a brewed coffee passage therethrough adapted for communication with a delivery conduit;
a filter on said piston in overlying relationship to said passage;
means for delivering hot water and ground coffee into the cylinder through said open top thereof;
a scraper member normally positioned adjacent the top of the cylinder in spaced relationship therefrom and movable along a path of travel in scraping disposition thereto;

closure means associated with said cylinder for closing said open top thereof; and drive means operably associated with said member, the piston and said closure means for first moving the piston downwardly as water and ground coffee is discharged into the cylinder by said delivery means, thereafter effecting closure of the cylinder with said closure means, then moving the piston upwardly in the cylinder to force brewed coffee through the filter and said passage into said conduit, next interrupting closure of the cylinder with said closure means while continuing to move the piston upwardly until the filter is substantially level with said top of the cylinder, and finally moving the scraper member across the top of the cylinder while the filter is maintained at the level of said top of the cylinder to scrape the coffee grounds from the filter.

10. The invention of claim 9:
said filter comprising a flexible screen of synthetic resin material extending transversely of said cylinder,
said piston and said closure means defining a closed chamber in said cylinder and trapping air in said chamber upon operation of the drive means to effect said closure of the cylinder with the closure means,
said piston being operable, upon said movement thereof upwardly in the cylinder, to compress the trapped air as the brewed coffee is forced through the filter whereby, after the brewed coffee is expelled from the chamber, the compressed air expands through the filter and flexes the latter to dislodge fine coffee residue embedded therein, dry the coffee grounds deposited on the filter, and purge the delivery conduit.

11. The invention of claim 10:
said piston having an upper face and being provided with a supporting grid engaging said filter thereneath and mounting the filter above said face in spaced relationship thereto, whereby said filter and said face define a cavity therebetween for receiving brewed coffee forced through the filter,
said passage communicating with said cavity through said face.

12. The invention of claim 9:
said cylinder being reciprocable up and down,
said closure means including a lid shiftable between a location above said top and a disposition spaced laterally therefrom,
said scraper member being coupled with said lid for movement therewith along said path when the lid is shifted from said location to said disposition thereof,
said drive means including a single prime mover having a rotatable output shaft, a pair of cams coupled with said shaft for rotation therewith, a first cam follower engageable with one of said cams and coupled with said cylinder for reciprocating the latter, a second cam follower engageable with the other of said cams and coupled with said lid for shifting the latter back and forth between said location and said disposition thereof, and crank means intercoupling said shaft and said piston for reciprocating the latter,
said cams being synchronized to shift said lid to said location and move said cylinder upwardly to effect said closure of the cylinder, move said cylinder downwardly to effect said interruption of closure of the cylinder, and shift the lid toward said disposition thereof and simultaneously effect said movement of the scraper member across the top of the cylinder.

References Cited

UNITED STATES PATENTS 3,203,340    8/1965    Totten            99—302 X
3,288,049    11/1966    Schmid et al.      99—289

WILLIAM I. PRICE, *Primary Examiner.*